PHOTOELECTRIC RELAY USING POSITIVE FEEDBACK

Filed Jan. 27, 1965 2 Sheets-Sheet 1

INVENTOR.
ALFRED L. CASE

BY Le Blanc & Shur

ATTORNEYS.

PHOTOELECTRIC RELAY USING POSITIVE FEEDBACK

Filed Jan. 27, 1965 2 Sheets-Sheet 2

INVENTOR.
ALFRED L. CASE

BY Le Blanc and Shur

ATTORNEYS.

United States Patent Office 3,462,606
Patented Aug. 19, 1969

3,462,606
PHOTOELECTRIC RELAY USING POSITIVE FEEDBACK

Alfred L. Case, Riverdale, Md., assignor to Versitron, Inc., Washington, D.C., a corporation of the District of Columbia Filed Jan. 27, 1965, Ser. No. 428,347
Int. Cl. H041 25/24, 25/26
U.S. Cl. 250—214 17 Claims

ABSTRACT OF THE DISCLOSURE

Disclosed is a solid state relay which provides improved electrical isolation between input and output coupled with a rapid response which relay may be employed as a direct substitute for present electromagnetic relays in Teletype and similar circuits. An electroluminescent diode radiates energy to a light radiation sensor connected in a novel bistable transistor circuit which rapidly switches between conducting and substantially nonconducting states. Positive feedback is employed from the output of the transistor switch through the light sensor to the switch input from a voltage dropping resistor or diode connected in series with a leakage current path across the switch output terminals. Switch conduction may represent either mark or space conditions in a Teletype loop.

The invention relates to a relay device and more particularly to a solid state relay particularly suited for use in telegraph and telegraph communication circuits. The device of this invention is powered by the incoming signal energy and requires no internal battery or other conventional power supply. It may be used as a direct plug-in substitute for the present commercial electromechanical relays used in these communication circuits.

Teletypewriter terminal equipment within the communications field as practiced today operates with more or less standardized input and output signals. These signals use the five level Baudot code and operate as DC "Teletype loops" in the range of from 20 to 60 milliamperes "neutral" or 30 milliamperes "polar."

A convention neutral loop is essentially a 130 volt DC source of power with a series current limiting resistor. The output of this combination thus tends to be a constant source of current for loads whose impedance is small compared to this current limiting resistor. The current limiting resistor is adusted so as to establish a current of 20 to 60 milliamperes (operational choice) through this loop and its load during a steady "mark" condition of the signal. This closed circuit "mark" condition represents one of the two binary states of the Baudot code. The second binary state is called "space" and is represented by zero current (open circuit) in the teletypewriter loop.

A conventional polar loop is a constant current loop similar to the neutral system except that two sources of power of opposite polarity (60 volts DC each) are applied alternately to this signal loop. The current limiting resistor is usually adjusted for 30 milliamperes. In the case of the polar loop, the "mark" binary condition is represented by current through the loop in one direction and the "space" condition is represented by loop current in the opposite direction.

From the above it is seen that the "sending" terminal equipment must interrupt the loop current in the case of neutral operation or transfer the loop load between two power supplies of opposite polarity in the case of polar opeartion. In the past these interrupting or transferring functions have been accomplished for the most part by electromechanical switching or relay type contacts. However, electromechanial relays are not completely satisfactory because of problems resulting from reliability, the necessity for adjustment and the rather frequent and hence expensive maintenance they require. In addition, the problems of electromagnetic incompatibility (radio interference) have brought about the need to eliminate the arc radiation from the electromagnetic relay metallic contacts.

It has long been recognized that solid state electronic components can be operated to perform a switching function. Unfortunately, these devices in the past have not been adapted for use as relays in telegraph and teletypewriter communications systems since they have been either too slow in operation, have required an internal power supply with the accompanying problems of space, weight, heat and noise, or simply have been too expensive to commercially compete with the electromechanical relay.

More recently it has been proposed to utilize an all electronic relay for telegraph and Teletype circuits generally referred to as a "tone coupler" which utilizes one or more blocking oscillators energized from the line signals. In addition to being fairly complicated and hence expensive, the tone couplers have the serious disadvantage that they generate harmonics which in many applications produce undesirable radio frequency interference with other equipment and especially with other portions of a Teletype communication system. Because of the electric and magnetic fields generated in these circuits they also lack the complete electrial isolation desired in an optimum switching device.

The present invention avoids the above mentioned difficulties by providing a solid state signal repeating relay which requires no internal power source and which does not generate any significant electromagnetic radiation. The device further provides a degree of electrical isolation from capacitive and inductive coupling far greater than possible with any of the other known relays.

This is brought about through the use of a solid state injection electroluminescent diode as a means of converting the Baudot code signals into light beam replicas of the input. The injection diode is an electro-optical transducer whose characteristics make it completely compatible with the standard DC teletypewriter loop signals currently used. That is, it operates at a few volts or less voltage drop at 20 to 60 milliamperes with a light output response which is acceptably fast for terminal read-in and print-out equipment. This is to be distinguished from the older incandescent light sources proposed for this purpose which are too slow to operate at the common speeds in the range of 60 to 100 words per minute which call for rise times in the order of ten to one hundred microseconds.

Once the information is in the form of a switched light beam, it is transmitted over a sufficient distance and through such a medium (air, lens system, plastic light guide, or fiber optical bundle) as to insulate and isolate the input loop circuit from the output circuit. The light then falls upon a photovoltaic or solar type cell which cell acts to switch a novel bistable non-oscillatory positive feedback circuit of solid state elements between the "on" and "off" conditions in accordance with the binary states of the incoming Baudot code.

It is therefore one object of the present invention to provide an improved solid state relay.

Another object of the present invention is to provide a relay particularly suited for use in telegraph and Teletype communication systems.

Another object of the present invention is to provide an improved solid state Teletype relay requiring no internal power supply.

Another object of the present invention is to provide a solid state relay for teletypewriter equipment having increased isolation between the relay input and output.

Another object of the present invention is to provide an improved teletypewriter relay producing little or no radio frequency interference.

Another object of the present invention is to provide a relatively simplified, inexpensive teletypewriter relay which may be used as a direct plug-in substitute for the currently used electromechanical relay. In the device of the present invention an injection type electroluminescent diode energized by the incoming line current produces at room temperatures a small amount of semi-coherent omnidirectional light in the infrared range between 9300 and 10,000 angstroms. This light is caused to impinge upon a photovoltaic silicon diode coupled in a bistable non-oscillatory positive feedback transistor circuit and acts to switch the circuit between the mark and space conditions, i.e., between the conducting and substantially non-conducting conditons, in the teletypewriter printing loop. In one of the two binary stable states the switching circuit draws a maximum current, while in the other state substantially no power is drawn from the power supply. The electroluminescent source and photovoltaic cell are preferably spaced approximately ⅛ inch apart to provide good electrical isolation (both inductive and capacitive) between the relay input and output circuits. This spacing may be increased to as much as 12 inches or more if desired and the source and cell may be connected by a light guide or a fiber-optical bundle to further increase the electrical isolation.

These and further objects and advantages of the invention will be more apparent upon reference to the following specification, claims and appended drawings wherein:

In the early days of electronics, it was proposed to use both visible and invisible light transmission for sending and receiving telegraph information. However, these systems for the most part relied upon some type of incandescent light source which because of its inherent heat dependency and consequent thermal lag is completely unsatisfactory for present-day telegraph and Teletype communications systems. Similarly, it has been proposed to provide an electroluminescent type relay for performing switching functions but these relays have not been compatible with conventional telegraph and Teletype requirements, in that they have not evidenced the rapid response required at the very low voltages and currents available in the signal leads of a telegraph or Teletype circuit. Likewise, with the advent of the maser and laser it has been proposed to utilize coherent light for switching, but in order to obtain an adequate power output the coherent light sources must be operated at relatively low temperatures, necessitating a substantial amount of expensive and complicated cryogenic equipment.

Figure 1:
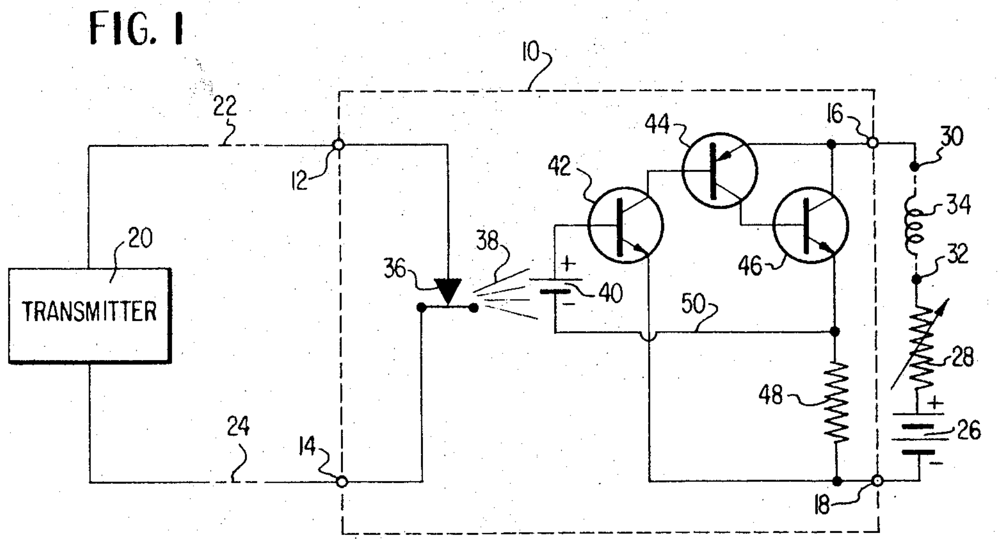
FIGURE 1 is a circuit diagram of the novel solid state relay of the present invention as incorporated in a teletypewriter circuit.

Referring now to the drawings and especially to FIGURE 1, the novel solid state relay of the present invention is generally indicated by its enclosure in the dashed box 10 and includes a pair of input terminals 12 and 14 and a pair of output terminals 16 and 18. Input terminals 12 and 14 are indicated as coupled to a suitable Teletype transmitter or sender 20 by way of electrical lines 22 and 24, which may be as short as a few feet or which may be many miles in length.

Output terminals 16 and 18 are illustrated in FIGURE 1 as coupled in series in a Teletype printer loop with a suitable 130 volt power supply illustrated by the battery 26 and a loop current regulator 28 indicated in the drawing by a variable resistance. A teletypewriter printer is conventially coupled between the printer terminals 30 and 32 and this is indicated in the drawing by showing the coil for the printer magnet at 34.

Connected to the input terminals 12 and 14 is an electroluminescent injection diode 36 which when energized by the incoming Teletype signals on lines 22 and 24 produces semi-coherent optical radiation indicated at 38. This diode is preferably a gallium arsenide PN type doped junction which produces semi-coherent omnidirectional light about 100 to 200 angstroms wide in the infrared range of from 9300 to 10,000 angstroms. Diodes of this type have been operated at room temperature to produce a few milliwatts output power which can be conducted with good efficiency for as much as 12–16 inches and more. Diodes satisfactory for operation at room temperature and higher in the present invention are currently produced by the Texas Instrument Corporation and are designated PEX 1201 (previously designated SNX 110).

The radiation 38 from diode 36 impinges upon one or more photovoltaic cells 40 which produce an output voltage with the polarity indicated in the drawing of something in the neighborhood of one or two tenths of a volt when subject to incident radiation. Cell 40 in the preferred embodiment is a conventional photovoltaic silicon diode more commonly used as a silicon solar cell. However, other conventional photovoltaic cells such as a gallium arsenide cell may be utilized if desired. The photovoltaic cell is coupled between the base of a first or input transistor 42 and the emitter of a third or output transistor 46. A second transistor 44 of the PNP type is interposed between the NPN type transistors 44 and 46 as a current amplifier.

An important feature of the present invention resides in the fact that the silicon cell 40 is connected in a novel positive feedback non-oscillatory circuit which operates in a bistable manner to increase the sensitivity of the switching circuit in response to optical radiation from the injection diode 36. This is accomplished in the simplified circuit of FIGURE 1 by inserting a voltage dropping resistance 48 in the emitter circuit of the output stage of the transistor 46 and coupling the potential developed across resistance 48 by way of lead 50 to the negative side of photovoltaic diode 40. In this way when transistor 42 is switched on by the voltage developed across diode 40 due to the incident radiation, the substantially simultaneous conduction of the output stage transistor 46 causes a positive potential to develop across resistor 48 and thus is fed back to the base of transistor 42 by way of the diode 40. The result is a positive feedback system which drives the transistors into the full conduction or saturation state which represents one state of the binary Baudot code. The positive feedback operates until the transistors are saturated to indicate either a mark or a space, whichever is represented by full conduction of the transistors. The circuit is bistable in the sense that the transistors will remain in the full conducting state as long as light energy impinges upon the silicon diode 40. However, as soon as the radiation ceases the optential developed by diode 40 ceases and the transistors all immediately switch to the "off" or non-conducting state which represents the other binary state of the desired code. In this non-conducting condition the transistors 42, 44 and 46 draw little or no power from the power supply 26 in the Teletype loop circuit.

Figure 2:
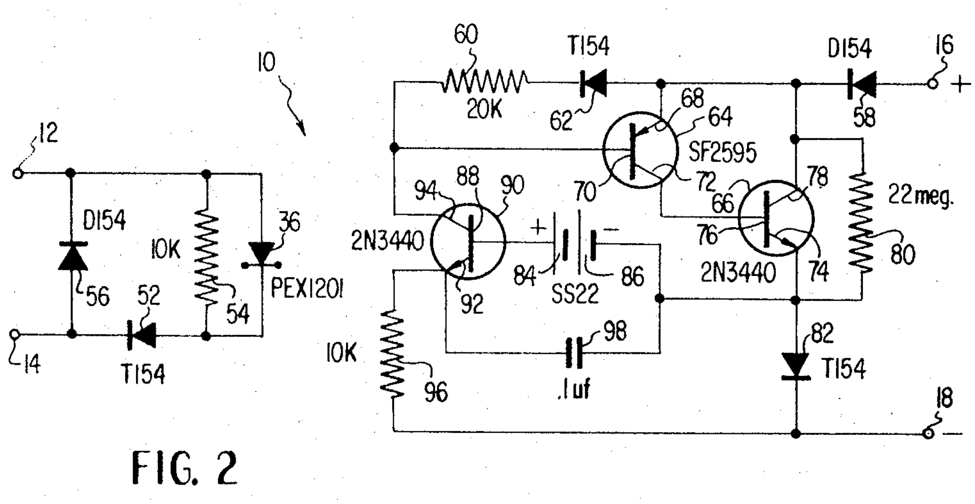
FIGURE 2 is a circuit diagram of one embodiment of the relay constructed in accordance with the present invention.

FIGURE 2 is a more detailed circuit diagram of a relay constructed in accordance with one embodiment of the present invention, again having the input terminals 12 and 14 for connection to a Teletype information source and output terminals 16 and 18 connectable in series in the Teletype loop in the manner illustrated in FIGURE 1. Output terminals 16 and 18 are illustrated as plus and minus respectively to indicate a neutral loop operation wherein the Teletype loop goes from essentially non-conducting (referred to hereafter as a space condition) to a full conducting state (hereinafter referred to as a mark condition). Input terminals 12 and 14 are connected to the injection diode light source 36 by way of a small signal silicon diode 52. Connected across the light source 36 on opposite sides of diode 52 are a 10 kilo-ohm resistor 54 and a high voltage silicon diode 56, respectively. Diodes 52 and 56 in conjunction with resistor 54 provide protection for the light source 36. Light source 36 consists of a diffused gallium arsenide PN junction which emits narrow spectrum infrared when biased in the forward direction. It produces what is called forward injection electroluminescence which does not depend upon the heating of an element or the ionization of a gas, which are the inherent speed limiting features of other emission sources. However, it has a low back resistance and is subject to being burned out when drawing excessive reverse current. For this reason high-voltage silicon diode 56 is connected across the light source with the polarity indicated so as to short out any opposite polarity signals applied to the input terminals 12 and 14. However, the high voltage diode 56 itself has some resistance and as additional protection the 10-kilo-ohm resistor 54 and diode 52 are provided.

Output terminal 16 coupled to the positive side of the power supply is connected through a high voltage silicon diode 54 to a temperature compensating circuit including a 20 kilo-ohm resistor 60 and silicon diode 62. Diode 58 is provided to protect against opposite polarity signals which might otherwise tend to burn out the transistors in the circuit. The temperature compensating resistor 60 and diode 62 are provided to compensate for leakage in the transistors. While the transistors have very little leakage at normal temperatures, the leakage through them may become significant at elevated temperatures and this is counteracted by the temperature compensation provided by resistor 60 and diode 62.

Connected across the loop terminals 16 and 18 are a pair of high voltage silicon transistors 64 and 66, the former of the PNP type having an emitter 68, a base 70 and a collector 72 and the latter of the NPN type having an emitter 74, a base 76 and a collector 78. A 22 mega-ohm space current leakage resistor 80 is connected across the collector-emitter circuit of transistor 66 for a purpose more fully explained below. The emitter 74 is coupled to the negative terminal of the power supply through silicon diode 82.

The photovoltaic sensitive elements in FIGURE 2 are illustrated as a pair of series connected silicon diodes or solar cells 84 and 86 with their polarities such that a positive potential is developed by incident radiation and applied to base 88 of an NPN silicon junction transistor 90 also having an emitter 92 and collector 94. A temperature compensating 10 kilo-ohm resistor 96 returns the emitter of transistor 90 to the negative power supply terminal 18. A .1 microfarad capacitor 98 is connected between emitter 92 and the negative terminal of the series connected photovoltaic cells 84 and 86. This capacitor 98 is provided to filter out transients or noise spikes which might otherwise trigger the circuit. Resistor 96, in addition to providing temperature compensation, also helps to turn the first stage transistor 90 off when the light source 36 is no longer energized.

In operation of the circuit of FIGURE 2 it is assumed that the source 36 is initially unenergized and that the Teletype loop is in the substantially non-conducting or space condition. At this time all of the transistors 64, 66 and 90 are turned off or non-conducting and very little power is drawn from the power supply coupled to terminals 16 and 18. However, the 22 mega-ohm resistor 80 is connected across the collector emitter circuit of transistor 76 so as to draw a very small amount of space current. This space current is in the micro-ampere range and is introduced on purpose to provide some small leakage across the transistor since, as previously mentioned, the transistors have very little leakage at room temperature. This leakage or space current passes through diode 82 and develops a very small initial potential drop across the diode when the relay is in the space condition, hence this leakage current is referred to as space current. This small potential drop across diode 82 is applied across the silicon cells 84 and 86 to the base of the first stage transistor 90 but is insufficient to turn the first stage on. However, incident radiation on the cells 84 and 86 produces an additional positive potential at the base 88 of the first stage transistor which, in conjunction with the small voltage drop across diode 82, is sufficient to turn on the first stage transistor 90. With transistor 90 rendered conducting, current is drawn into the base of transistor 64 turning this transistor on and similarly into base 76 of transistor 66 also turning that transistor on. Conduction through the output stage transistors 70 and 76 which amplify the signal from the first stage transistor 90 causes a much larger potential drop across diode 82 which is positively fed back to the base 88 of transistor 90. In this way all transistors are driven into heavy conduction or the mark state which is maintained until the radiation from source 36 ceases. At this time the circuit acts as a bistable circuit in that the transistors immediately turn off or return to the space condition where only a small amount of space current flows through resistor 80 and diode 82. This space current is provided to increase the sensitivity of the circuit to incident radiation on cells 84 and 86.

Figure 3:
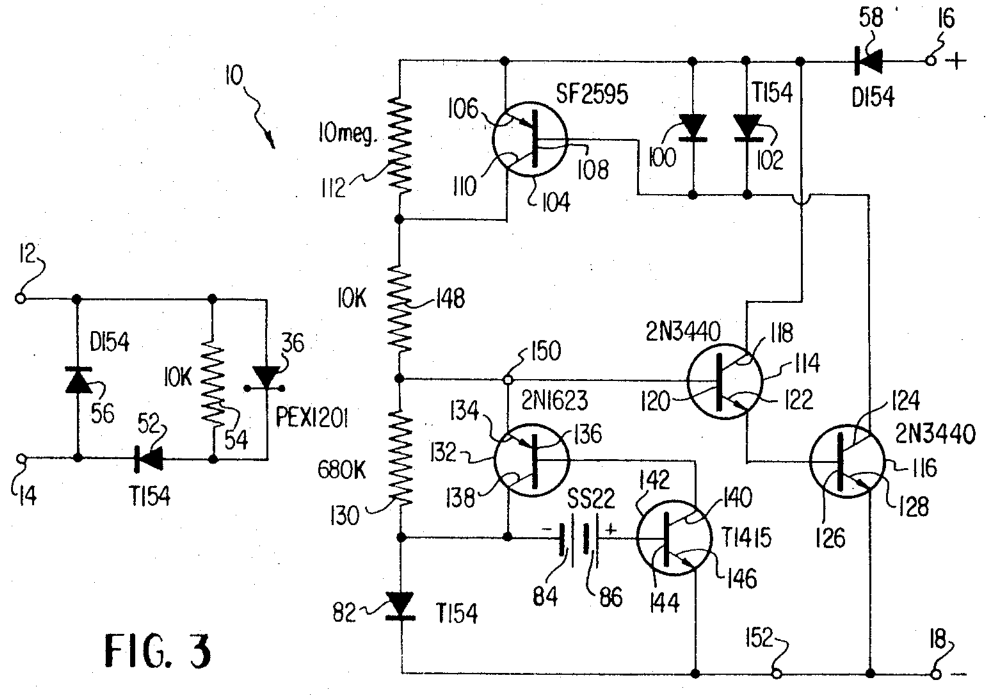
FIGURE 3 is a circuit diagram of a relay constructed in accordance with another embodiment of the present invention.

As previously mentioned, the relay circuit of FIGURE 2 is constructed such that the transistors are all conducting and drawing power when the photovoltaic cells 84 and 86 are irradiated by light energy from the source 36. In FIGURE 3 is shown a modified embodiment of the present invention which acts as an inverter such that the Teletype loop draws heavy current when the photovoltaic cells are not illuminated but is effectively open circuited when the source 36 is energized. This circuit is useful in situations in which contrary to the condition in FIGURE 2 it is desired to represent a mark condition by an open circuit and a space condition by a closed loop circuit.

In FIGURE 3, like parts bear like reference numerals and the input circuit is identical to that of FIGURE 2, namely, consisting of the radiation source 36, parallel resistor 54 and the protective diodes 52 and 56 all coupled to the input terminals 12 and 14. In the printing loop the positive power supply terminal 16 is coupled through polarity protection diode 58 to a pair of parallel connected temperature compensating small signal silicon diodes 100 and 102. These are connected across the emitter-base circuit of a high voltage PNP silicon transistor 104 having an emitter 106, a base 108, and a collector 110. A space current or a leakage current 10 mega-ohm resistor 112 is connected across the emitter-collector circuit of transistor 104. Connected between the power supply terminals 16 and 18 are a pair of output stage transistors, 114 and 116 of the high voltage NPN silicon junction type, the former having a collector 118, a base 120, and an emitter 122 and the latter similarly having a collector 124, a base 126 and emitter 128. This last mentioned transistor electrode is connected to the negative power supply terminal 18.

Connected across a 680 kilo-ohm resistor 130 is a driver transistor 132 consisting of a PNP low-voltage silicon junction transistor having an emitter 134, a base 136 and a collector 138. The base 136 of transistor 132 is connected to the collector 140 of a low-voltage silicon NPN junction transistor 142 also having a base 144 and an emitter 146. Emitter 146 is coupled to the negative terminal 118. Resistor 130 is provided to act as an aid in turning off the circuit at high temperatures where the transistors may become leaky. This resistor is connected to the lower end of a 10 kilo-ohm resistor 148 which serves two purposes, that is, to limit the base current into the driver transistor 114 and to provide a voltage drop for the network including low-voltage transistors 132 and 142. The lower end of resistor 130 is connected to diode 82 and the two photovoltaic cells 84 and 86 are connected between the collector 138 of transistor 132 and the base 144 of transistor 142.

In the operation of the relay circuit of FIGURE 3, when the loop is completed through the power supply terminals 16 and 18 the high-voltage transistors 104, 114 and 116 are turned on and conduct heavily to saturation. This assumes that the light source 36 is unenergized and no voltage is developed by the photovoltaic cells 84 and 86. Thus, as opposed to the circuit of FIGURE 2, the loop in FIGURE 3 is heavily conducting in the space condition, that is, when the input line in unenergized, so that the circuit of FIGURE 3 is inverted with respect to the circuit of FIGURE 2. However, the network including low-voltage transistors 132 and 142 acts as a two-terminal network between terminals 150 and 152 much in the manner of the transistor switching circuit of FIGURE 2. That is, a small current is drawn through the 10 mega-ohm space-current resistor 112 to develop a small voltage drop across diode 82 which acts to increase the sensitivity of the circuit. When the light source 36 is energized the voltage developed by cells 84 and 86 supplies an additional positive potential to the base 44 of transistor 142 which is sufficient to turn the transistor on. Transistor 142 supplies base current to the transistor 132, also turning this transistor on and thus passing more current through the diode 82 so as to increase its potential and further drive transistor 142 in a positive feedback manner much in the manner previously described in connection with the circuit of FIGURE 2. The result is that the two terminal network between terminals 150 and 152 including transistors 132 and 142 when energized act much in the manner of a short to short out the high voltage transistors 104, 114 and 116 so as to render them non-conducting so that the printer loop circuit is effectively open-circuited. Very little power is drawn when the high voltage transistors 104, 114 and 116 are turned off since the signals to transistors 132 and 142 are limited by the 10 mega-ohm resistor 112 so that the shorting circuit is operated by very small signals which draw little power. As soon as the photovoltaic cells 84 and 86 become unenergized the circuit returns to its initial state with transistors 132 and 142 turned off and the high-voltage transistors 104, 114 and 116 turned back on.

Figures 4, 5:
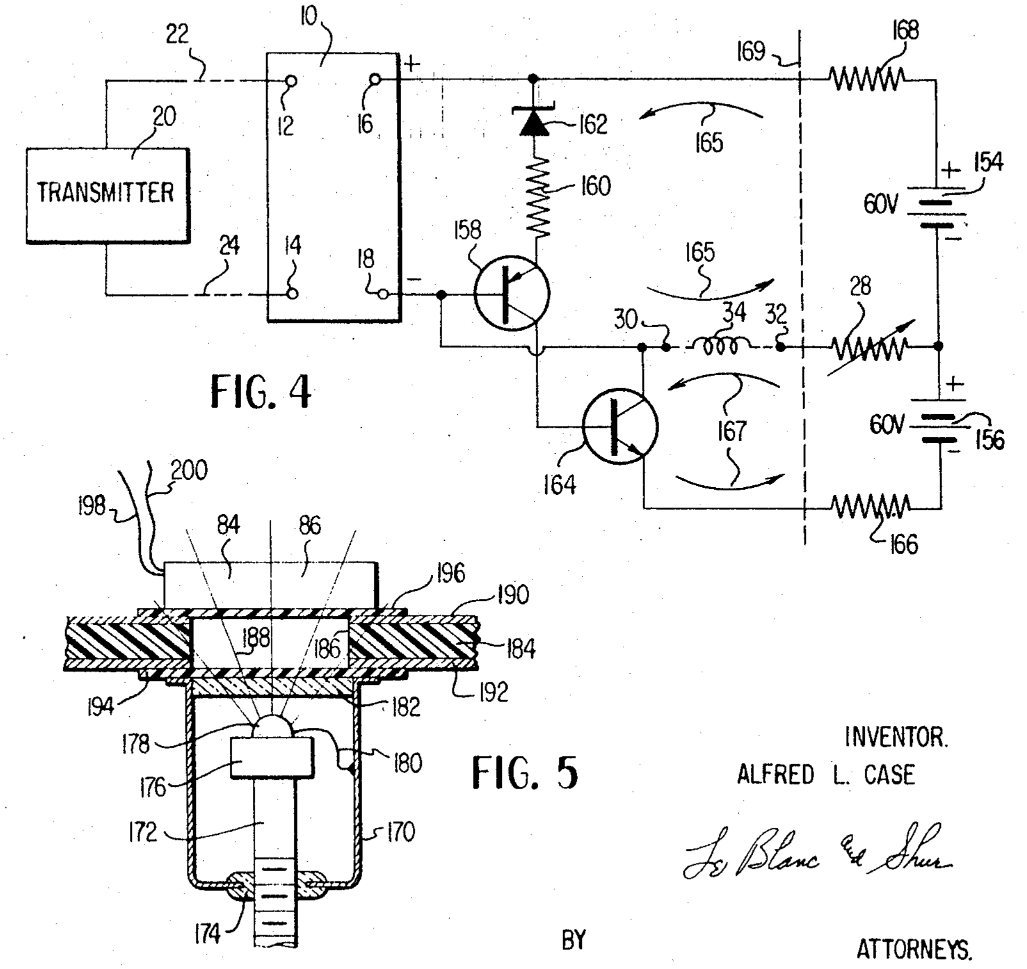
FIGURE 4 is a circuit diagram of a polar relay arrangement constructed in accordance with the present invention.
FIGURE 5 shows the mechanical construction of the light source and detector assembly portion of the relay.

FIGURE 4 is a circuit diagram which shows the relay 10 of the present invention which may take the form illustrated in either FIGURES 1, 2 or 3 connected in a polar teletypewriter circuit. In FIGURE 4 like parts bear like reference numerals and the transmitter 20 is again shown as connected through the lines 22 and 24 to the input terminals 12 and 14 of the solid state relay of the present invention. In FIGURE 4 the output terminals 16 and 18 of the relay are connected to a polar Teletype loop including a pair of 60 volt power supply sources illustrated by the batteries 154 and 156. The current from these batteries passes through the loop current regulator 28 which is conventionally adjusted to provide approximately a 30 multi-amp current flow through the printer coil 34 coupled to the printer terminals 30 and 32.

In the polar arrangement the output terminal 18 is connected to the base of a high-voltage silicon PNP junction transistor 158 which has coupled in its emitter circuit a large current limiting resistor 160 and Zener diode 162. The collector of transistor 158 is in turn coupled to the base of a high voltage silicon NPN transistor 164. The emitter of transistor 164 is returned to the negative side of battery 156 through a suitable ballast resistor 166. A similar ballast resistor 168 is coupled to the positive terminal of the other power supply battery 154.

In operation of the polar unit of FIGURE 4, when the switch 10 is turned on, i.e., is in the conducting state, current flows through the upper loop 165 in the direction of the arrows as indicated, from the positive side of the battery 154 through the switch 10 and back to the negative side of the battery through printer terminals 30–32 and current regulator 28. The Zener diode 162 is chosen such that its offset voltage is greater than the saturation voltage of the switch 10 so that when current is flowing in loop 165 no significant current passes through the Zener diode 162 and transistors 158 and 164 are turned off. However, when the signal from transmitter 20 reverses so as to render the switch 10 non-conducting or effectively an open circuit, the voltage from battery 154 is sufficient to make the Zener diode 162 conduct so as to turn on transistors 158 and 164. Resistor 160 is chosen of sufficient value to limit the current through Zener diode 162 but at the same time to provide sufficient current for the base of transistor 164 so that transistor 164 will turn on along with transistor 158. Because resistor 160 is quite large, the current flow from battery 154 when loop 165 is in the space condition is small and in any event has no adverse effect because it does not pass through coil 34.

However, conduction of transistors 158 and 164 resulting from the change-over of switch 10 to the open circuit condition completes a high current path through the loop 167 in the direction of the arrows shown in FIGURE 4 from the positive side of the battery 156, through regulator 28, printer terminals 30 and 32 and the transistor 164 to the negative side of power supply 156. This current is substantially equal in magnitude but opposite in direction through the printer terminals 30 and 32 in comparison with the current previously flowing in loop 165. As soon as switch 10 returns to the full conducting state in the manner described in conjunction with FIGURES 1, 2 or 3, Zener diode 162 immediately blocks current to transistors 158 and 164, these transistors are turned off, and current again flows through the upper loop 165 whereby the entire sequence may be repeated consistent with changes in the incoming signal from transmitter 20. The conventional external portions of the circuit including the power supplies, loop regulator and ballast resistors are indicated in FIGURE 4 to the right of the dashed line 169.

FIGURE 5 shows the mechanical construction for a preferred embodiment of the relay of FIGURES 1 through 4, which relay is constructed as a direct plug-in substitute for the presently used electromagnetic relays in telegraph and teletypewriter communication circuits. The transmitting element 36 is illustrated as comprising a TO5 transistor can 170 through which passes a threaded connector pin 172 coupled to the can through a glass to metal seal and insulator indicated generally at 174. The upper end of pin 172 terminates in a copper heat sink block 176 upon which is mounted the dome-shaped gallium arsenide electroluminescent diode 178. Electrical connection to one terminal of the diode is by way of connector pin 172 while the other terminal of the diode is indicated as connected to the transistor case 170 by way of lead 180. The upper end of the can 170 is crimped over to tightly retain in a sealed manner a glass plate 182.

Transistor can 170 is spaced from the side-by-side positioned photovoltaic cells 84 and 86 by a $\frac{1}{16}$ inch printed circuit board 184 having an aperture 186 aligned with the glass plate 182 and through which pass the light rays 188. Printed circuit board 184 is provided with copper cladding 190 and 192 on both sides, which cladding acts as a circuit ground for the relay. Spacing the transistor can from the copper clad printed circuit board is a first transparent insulating Mylar sheet 194 and a similar Mylar sheet 196 spaces the copper clad printed circuit board from the photovoltaic or solar cells 84 and 86. The entire unit including the appropriate additional solid state circuitry is preferably suitably mounted in an enclosure or housing (not shown) to form a direct plug in substitute for a conventional electromagnetic relay. Electrical connection to the solar cells from the remaining electronic circuitry is made by way of the two leads illustrated at 198 and 200. The dimensions of the unit are such that the total distance between the diode 178 and the solar cells 84 and 86 is approximately ⅛ inch, which distance provides very good electrical isolation between the input circuit coupled to a diode 78 and the output circuit coupled to photovoltaic cells 84 and 86. At the same time this approximately ⅛ inch spacing assures efficient transmission of light through the glass plate 182, the Mylar sheets, and the air space provided by aperture 186 to the photovoltaic cells so that the device is quite sensitive to incoming line signals.

It is apparent from the above that the present invention provides a novel and improved solid state relay which meets all the requirements for use in conventional telegraph and teletypewriter switching applications. The unit possesses very rapid response, high sensitivity, and excellent electrical isolation. No internal power supply with the accompanying disadvantages of weight, complexity, and generated heat is required and little or no radio frequency interference is generated by the relay. While the invention has been described in conjunction with a specific source diode, other commercial diodes meeting the requirements of high speed, i.e., no thermal or ionization lag, low heat generation, high power output at the low voltages and currents available and good efficiency of operation may be utilized. Likewise, while the unit has been described in conjunction with silicon solar cells 84 and 86, other photovoltaic devices sensitive to the energy of the source 178 may be used, such as some of the gallium arsenide solar cells currently available. Important features of the present invention also include its ability to produce a substantial light output at room temperatures and the novel bistable transistor switching circuit which through positive feedback of the non-oscillatory type substantially increases the sensitivity of the circuit and makes it possible to utilize the much cheaper photovolatic cells rather than a much more expensive purely photoconductive or photoresistive device.

In addition, while the preferred embodiment of FIGURE 5 illustrates an air path for the travel of light from the source to the photovoltaic cells, it is readily apparant that other light transmission mediums may be employed, such as a Lucite rod polished at both ends, a lens system for focusing the light on the photovoltaic cells, and even a light guide in the form of a fiber optical bundle may be employed between the diode 178 and the photovoltaic cells 84 and 86. The better the light transmission medium, the larger the spacing between the source and photovoltaic cells may be permitted and spacings of as much as 12 or 16 inches and higher may be used in conjunction with the good light conducting mediums described above.

As used herein the terms "light" and "optical radiation" are meant to include visible, infrared and ultraviolet wavelengths capable of being propagated sufficient distances through air and the other media mentioned above to give good electrical isolation between the source and radiation sensor.

The invention may be embodied in other specific forms without departing from the spirit or essential characteristics thereof. The present embodiments are therefore to be considered illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A relay comprising a pair of input terminals, an electroluminescent source coupled to said input terminals, an optical radiation sensor spaced from said source to receive optical radiation therefrom, a pair of output terminals, a semiconductor switch coupled between said output terminals and switchable between conducting and substantially nonconducting states in response to radiation impinging upon said sensor from said source, an impedance coupled in series with said switch between said output terminals, means coupled to said output terminals for supplying a reduced current to said impedance when said switch is in said nonconducting state, and positive feedback means coupling said impedance to the input of said switch.

2. A relay according to claim 1 including at least one semiconductor inverting stage coupled to said output terminals, said switch when in said conducting state acting to short out said inverting stage.

3. A relay according to claim 1 wherein said switch comprises a plurality of amplifying stages, said positive feedback means coupling a signal from the last to the first stage of said switch.

4. A relay according to claim 1 wherein said switch comprises at least one amplifying stage, said feedback means coupling a signal from the output to the input of said switch through said radiation sensor.

5. A relay according to claim 1 wherein said electroluminescent source comprises a semiconductor diode.

6. A relay comprising a pair of input terminals, an electroluminescent diode source coupled across said input terminals, an optical radiation sensor spaced from said source to provide electrical isolation from said source while at the same time receiving optical radiation therefrom, a pair of output terminals, a transistor switch having its emitter-collector circuit coupled across said output terminals, an impedance in series with the emitter-collector circuit across said output terminals, means coupled to said output terminals for supplying a reduced current to said impedance when said transistor switch is turned off, and positive feedback means coupled to said impedance for feeding a signal from the impedance to the base of said transistor switch through said radiation sensor.

7. A relay according to claim 6 wherein said impedance comprises a voltage dropping resistor.

8. A relay according to claim 6 wherein said impedance comprises a diode.

9. A relay according to claim 6 wherein said means for supplying a reduced current to said impedance comprises a second impedance in parallel with said transistor switch.

10. A relay according to claim 6 wherein said means for supplying a reduced current to said impedance comprises a current leakage path through said transistor switch.

11. A relay according to claim 6 wherein said transistor switch comprises three transistor stages, said feedback means feeding a signal from said impedance in series with the last stage of said switch to the input of the first stage of said switch.

12. A relay according to claim 6 including at least one semiconductor inverting stage coupled to said output terminals, said switch when in said conducting state acting to short out said inverting stage.

13. A solid state relay comprising a pair of input terminals, an electroluminescent source coupled to said input terminals, an optical radiation sensor spaced from said source to receive optical radiation therefrom, a pair of output terminals, a first transistor, said sensor being coupled in the base circuit of said first transistor, second and third transistors, means coupling the emitters of said first and third transistors to one of said output terminals, means coupling the collector of said first transistor to the base of said second transistor, means coupling the emitter of said second transistor and the collector of said third transistor to the other of said output terminals, means coupling the collector of said second transistor to the base of said third transistor, a voltage dropping impedance coupled across said output terminals in series with the emitter of said third transistor, means coupled to said output terminals for supplying a reduced current to said voltage dropping impedance when said third transistor is in the nonconducting state, and positive feedback means coupling the emitter of said third transistor back to the base of said first transistor through said radiation sensor.

14. A solid state relay according to claim 13 including diode protection means coupled to said electroluminescent source.

15. A solid state relay according to claim 13 including a spaced current resistor coupled between the emitter and collector of said third transistor, said impedance comprising a voltage dropping diode coupled between the emitter of said third transistor and said one output terminal.

16. A solid state relay according to claim 15 wherein said radiation sensor comprises at least one photovoltaic cell coupled between the base of said first transistor and the emitter of said third transistor, and a filter capacitor coupled between the emitters of said first and third transistors.

17. A solid state relay comprising a pair of input terminals, an electroluminescent source coupled to said input terminals, an optical radiation sensor spaced from said source to receive optical radiation therefrom, a pair of output terminals, a plurality of high voltage transistor stages coupled between said output terminals, a low voltage driver transistor, a space current resistor coupled between the emitter and collector of said driver transistor, a voltage dropping diode coupling the collector of said driver transistor to one of said output terminals, a low voltage switching transistor, means coupling the emitter of said switching transistor to said one output terminal, means coupling the base of said driver transistor to the collector of said switching transistor, said radiation sensor being coupled between the base of said switching transistor and the collector of said driver transistor, and means coupling the emitter of said driver transistor to said output stages.

References Cited

UNITED STATES PATENTS

| | | | |
|---|---|---|---|
| 3,005,915 | 10/1961 | White et al. | 250—214 |
| 3,321,631 | 5/1967 | Biard et al. | 250—209 |

WALTER STOLWEIN, Primary Examiner

MARTIN ABRAMSON, Assistant Examiner

U.S. Cl. X.R.

250—206, 213; 307—253, 289